United States Patent [19]

Horiguchi

[11] Patent Number: 4,930,088
[45] Date of Patent: May 29, 1990

[54] ROTATED GRAPHIC PATTERN GENERATING SYSTEM

[75] Inventor: Ryuji Horiguchi, Tokyo, Japan

[73] Assignee: NEC Corporation, Tokyo, Japan

[21] Appl. No.: 76,452

[22] Filed: Jul. 22, 1987

[30] Foreign Application Priority Data

Jul. 22, 1986 [JP] Japan ................................ 61-173105

[51] Int. Cl.⁵ ............................................. G06F 15/40
[52] U.S. Cl. ..................................... 364/518; 364/521; 382/44
[58] Field of Search ............................... 364/518–523; 382/44–46; 340/721, 727

[56] References Cited

U.S. PATENT DOCUMENTS 3,976,982  8/1976  Eiselen ................................. 382/44
4,631,750  12/1986  Gebriel et al. ..................... 382/44 X
4,635,212  1/1987  Hatazawa ........................ 382/44 X

*Primary Examiner*—Gary V. Harkcom
*Assistant Examiner*—H. R. Herndon
*Attorney, Agent, or Firm*—Foley & Lardner, Schwartz, Jeffrey, Schwaab, Mack, Blumenthal & Evans

[57] ABSTRACT

A rotated pattern generating system includes at least a X-direction straight line generator adapted to calculate, a difference in X- and Y-directions between the position of a given dot on a destination coordinate and a position of the next dot to be coordinate transformed. The difference is determined by the difference on the source coordinate between the given dot and the next dot to be transformed and a required rotational angle $\theta$. The system further comprises a detector connected to the X-direction straight line generator for discriminating whether or not a residual pattern occurs each time the X-direction straight line generator generates an output, and a dot generator responsive to the output of the detector to generate, when a dot lack is discriminated on the position of the residual pattern the same dot information as that of the dot adjacent to the residual pattern position in the destination coordinate.

3 Claims, 4 Drawing Sheets

ROTATED GRAPHIC PATTERN GENERATING SYSTEM

BACKGROUND OF THE INVENTION

1. Field of the Invention

The present invention relates in general to graphic display techniques, and more specifically to a rotated graphic pattern generating system for rotating a graphic pattern stored in a display memory so that a rotated graphic pattern can be displayed.

2. Description of Related Art

Heretofore, in order to rotate a given graphic pattern, two methods have been known.

A first method includes an individual coordinate transformation of a required rotational angle $\theta$ of respective dots included in a source graphic pattern on a dot by dot basis. All of this processing is executed on a the program-basis.

A second method uses a X-direction straight line generator and a Y-direction straight line generator. The X-direction straight line generator is used to rotate one line of X direction included in a source graphic pattern to be rotated, and the Y-direction straight line generator is used to rotate a left side of the source graphic pattern to be rotated, i.e., a reference point (or a leading point) of each line of the X direction. These generators are used in combination to convert respective dots included in the source graphic pattern in an incremental manner starting from the reference point.

The first method needs a large amount of calculation of trigonometric functions, because the coordinate transformation must be performed for each dot by using the trigonometric functions. Therefore, a long calculation time is inevitably required, and a large amount of hardware must be installed. On the other hand, the second method is free from the above mentioned defect of the first method, because the coordinate transformation can be obtained from only repeated addition and subtraction based on a straight line generation algorithm.

Here, the second method will be explained in more detail with reference to the drawings. FIG. 1A illustrates one example of dot distribution included in a given rectangular pattern P on a source coordinate. FIG. 1B illustrates a rotated straight line generated by the X-direction straight line generator from a line $L_1$ included in the source pattern P. FIG. 1C illustrates a rotated pattern generated by the X-direction straight line generator and the Y-direction straight line generator in combination from the rectangular pattern P on the source coordinate shown in FIG. 1A.

First, the line $L_1$ included in the rectangular pattern P on the source coordinate and in parallel to the X-axis of the source coordinate is rotated. For this purpose, the X-direction straight line generator is used to perform the coordinate transformation starting from the leading dot $a_1$ ($XS_1$, $YS_1$) of the line $L_1$ to the trail end dot on the same line $L_1$ on a dot by dot basis such that after one dot is coordinate-transformed, another dot adjacent to the transformed dot is coordinate-transformed, so that the coordinate-transformed dots are plotted on a destination coordinate. Now, assuming that the dot ($XS_1$, $YS_1$) on the source coordinate is transformed to a dot ($XD_1$, $YD_1$) on the destination coordinate, and a rotational angle $\theta$ is less than 45 degree, the dot ($XS_1+1$, $YS_1$) adjacent to the dot ($XS_1$, $YS_1$) on the line $L_1$ is transformed to (A) the destination coordinate position ($XD_1+1$, $YD_1$), or (B) the destination coordinate position ($XD_1+1$, $YD_1+1$).

Which of (A) and (B) is selected is determined each time a dot is plotted on the destination coordinate so that the deviation is minimized between the dot pattern plotted on the destination coordinate and a straight line $M_1$ obtained by geometrically rotating the line $L_1$ by an angle $\theta$. In the example of FIG. 1B, (A) and (B) are alternately selected. If the rotation angle $\theta$ is made smaller, the proportion of time that (A) is selected will become larger.

In the manner as mentioned above, the position to which one dot on the source coordinate is to be coordinate-transformed i.e., moved, is determined on the destination coordinate system, and then, the dot information on the source pattern corresponding to that dot is rewritten to the dot position determined on the destination coordinate. Thereafter, the coordinate transformation of the next dot is executed in the same manner.

Thus, the above mentioned processing is repeatedly performed until the drawing operation is completed over the full length DH of the line $L_1$ in the X direction. Thereafter, the coordinate transformation is executed on the second line $L_2$. In this operation, a dot position on the destination coordinate corresponding to the leading dot of the line $L_2$ on the source coordinate is generated in the Y-direction straight line generator. Then, the other dot positions on the destination coordinate corresponding to the second and succeeding dots of the line $L_2$ are produced by the X-direction straight line generator, so that a rotated pattern of the second line $L_2$ is drawn.

The above operation is repeated over a full length DV in the Y direction. Thus, the rotated pattern is drawn as shown in part in FIG. 1C.

However, the second method as mentioned above is disadvantageous in that unredrawn portions are generated in the rotated pattern as indicated by $Z_1$, $Z_2$, $Z_3$ in FIG. 1C. In the unredrawn portions, the information before the rotation of the pattern remains. Such portions $Z_1$, $Z_2$, $Z_3$ etc. are termed "bugs" or "residual portions" or "residual patterns". The rotated pattern having the residual portions in the redrawn area are undesirable.

SUMMARY OF THE INVENTION

Accordingly, it is one object of the present invention to provide a rotated graphic pattern generating system which is free from the above mentioned defects of the conventional ones.

Another object of the present invention is to provide a rotated graphic pattern generating system capable of generating a rotated graphic pattern having no unredrawn or residual portions.

Still another object of the present invention is to provide a rotated graphic pattern generating system which comprises only a slight additional elements in comparison with the conventional one and which can produce a rotated graphic pattern having no unredrawn or residual portions.

The above and other objects of the present invention are achieved in accordance with the present invention by a rotated pattern generating system which includes at least a X-direction straight line generator adapted to calculate, when there is to be determined a position on a destination coordinate of a next dot (e.g. second) adjacent to a just before coordinate-transformed dot (e.g. first) in the X direction on a source coordinate, a difference in X- and Y- directions between the position of the first coordinate-transformed dot on the destination coordinate and a position of the second coordinate-transformed dot on the destination coordinate. This difference is determined by the difference on the source coordinate between the first transformed dot and the second dot to be transformed and a required rotational angle $\theta$. The particular improvement of the invention comprises a detector connected to the X-direction straight line generator for discriminating whether or not a residual portion occurs each time the X-direction straight line generator generates an output, and a dot generator operative in response to the output of the detector to generate, when a residual portion is discriminated, a signal which causes the display to draw the same dot information at the position of the residual portion as that of the dot adjacent to the residual portion position in the destination coordinate.

With the above arrangement, when a residual portion would have occurred, its position is supplemented with the same dot information as that of the adjacent dot position in the destination coordinate. Therefore, no unredrawn portion or residual portions occur in the rotated pattern on the destination coordinate, and therefore, the rotated pattern is free from any phantom images.

According to another aspect of the present invention, there is provided a rotated pattern generating system for rotating by a given rotational angle $\theta$ a dot pattern information stored in a given area in a display memory, comprising:

a display memory storing a dot information for a dot pattern to be rotated by a given rotational angle $\theta$;

a source coordinate register for holding a dot coordinate position in a source coordinate defining the dot pattern before the pattern rotation;

a destination coordinate register for holding a dot coordinate position on a destination coordinate defining a dot pattern after the pattern rotation;

a X-direction straight line generator for generating a first pair of increment signals of zero or integer values for X-and Y- directions, the increment signals being respectively representative of a difference in X- and Y-directions between the destination coordinate position of the just before (e.g., first) coordinate-transformed dot and the destination coordinate position of the next dot (e.g., second) to be coordinate-transformed, in accordance with the given rotational angle $\theta$ and on the basis of the difference on the source coordinate between the first coordinate-transformed dot and the second coordinate-transformed;

a Y-direction straight line generator for generating a second pair of increment signal of zero or integer values for X-and Y- directions, the second increment signals being respectively representative of a difference in X- and Y- directions between the destination coordinate position of the just before (e.g., a first) coordinate-transformed dot and the destination coordinate position of the next dot (e.g., a second) to be coordinate-transformed, in accordance with the given rotational angle $\theta$ and on the basis of the difference on the source coordinate between the just before coordinate-transformed dot and the next dot to be coordinate-transformed;

an adder receiving the first and second increment signals and the current coordinate position data held in the destination coordinate register so as to output, as the next destination coordination position data, the results of addition to the destination coordinate register;

a drawer for receiving the data from one of the source coordinate register and the destination coordinate register to calculate an address of the display memory to be accessed and to output the calculated address to the display memory;

a dot information register for holding a dot information read out from the address of the display memory designated by the drawer;

a processing unit for initializing the above mentioned generators and registers and controlling the read/write of the display memory; and a dot generator discriminating whether or not a residual portion occurs each time the X-direction straight line generator generates the increment signal, and for generating, when a residual portion is discriminated, a signal which causes the display to draw on the position of the residual portion the same dot information as that of the dot adjacent to the residual portion position in the destination coordinate.

The above and other objects, features and advantages of the present invention will be apparent from the following description of the preferred embodiment of the invention with reference to the accompanying drawings.

DESCRIPTION OF THE PREFERRED EMBODIMENT

Figure 1A:
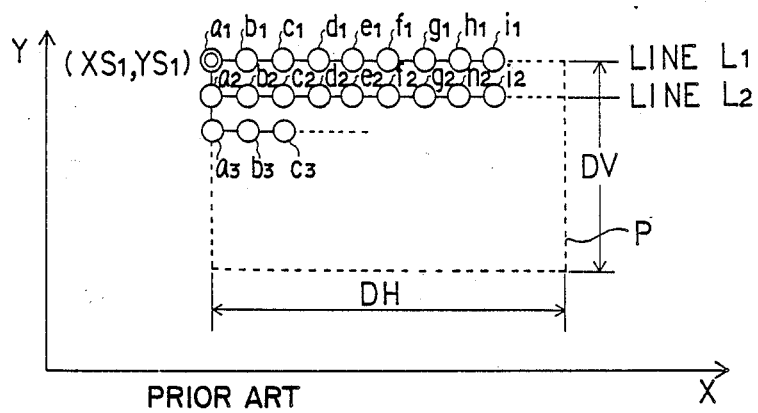
FIG. 1A illustrates one example of a dot distribution included in a given rectangular pattern on a source coordinate.
Figure 1B:
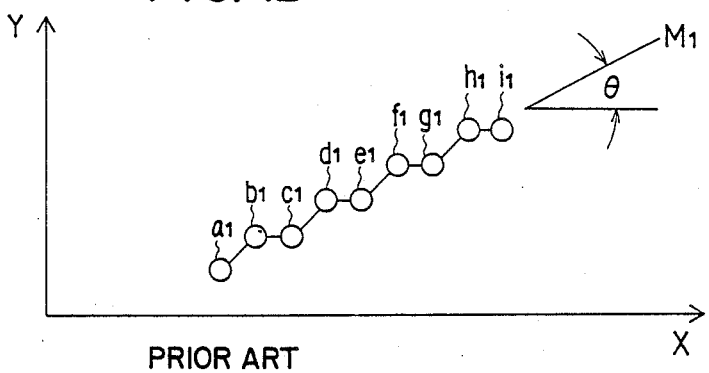
FIG. 1B illustrates a rotated straight line generated by the X-direction straight line generator from a line $L_1$ included in the source pattern.
Figure 1C:
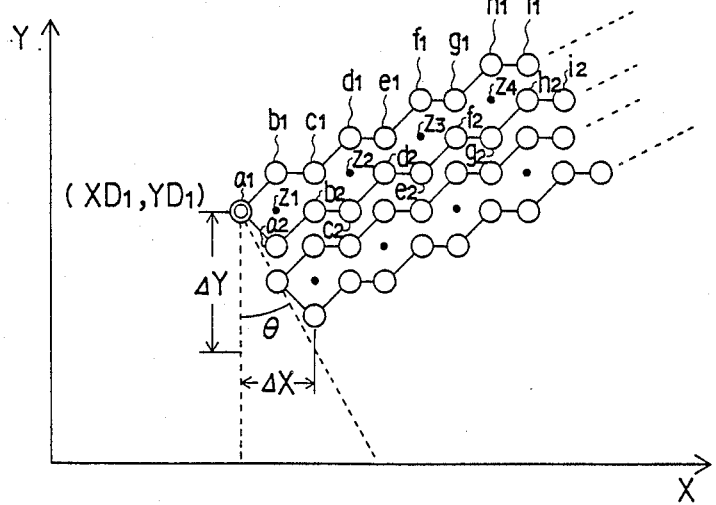
FIG. 1C illustrates a rotated pattern generated by the X-direction straight line generator and the Y-direction straight line generator in combination from the rectangular pattern on the source coordinate shown in FIG. 1A.
Figure 2:
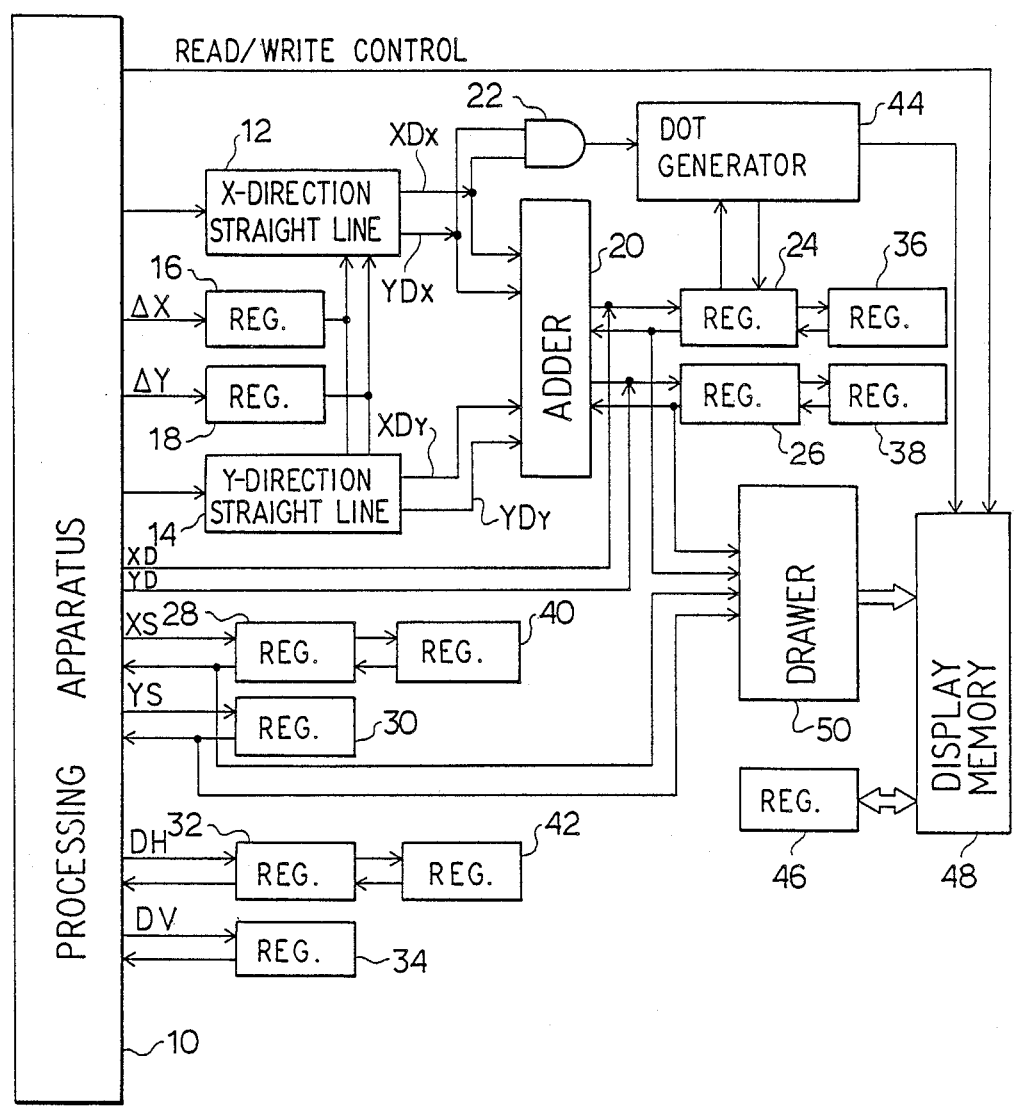
FIG. 2 is a block diagram showing one embodiment of the rotated pattern generating system in accordance with the present invention.

Referring to FIG. 2, there is shown one embodiment of the rotated pattern generating system in accordance with the present invention. The shown system comprises a processing apparatus 10 adapted to perform necessary programmed calculations and programming operations and to control associated circuits. Namely, the processing apparatus 10 is associated with a X-direction straight line generator 12 and a Y-direction straight line generator 14. The former generator 12 is adapted to perform the following operation: When there is to be determined a position on a destination coordinate of a next dot adjacent to a reference or leading dot of a X-direction line on a source coordinate or a just given coordinate-transformed dot of a X-direction line on the source coordinate, the X-direction straight line generator 12 calculates a difference in X- and Y- directions between the destination coordinate position of the leading dot or the given coordinate-transformed dot and the destination coordinate position of the next dot to be coordinate-transformed. Such calculation is done in accordance with a required rotational angle $\theta$ and on the basis of the difference on the source coordinate between the leading dot or the given coordinate-transformed dot and the next dot to be coordinate-transformed. On the basis of the difference thus obtained, the X-direction straight line generator generate an increment signal of zero or an integer value for each of the X-and Y- directions (zero or +1 or −1 in this embodiment). On the other hand, the Y-direction straight line generator 14 will operate, when there is to be determined a position on a destination coordinate of a next dot adjacent to a given coordinate-transformed dot in a Y-direction line on the source coordinate, to calculate a difference in X- and Y- directions between the destination coordinate position of the given coordinate-transformed dot and the destination coordinate position of the next dot to be coordinate-transformed. Such calculations are done in accordance with a required rotational angle $\theta$ and on the basis of the difference on the source coordinate between the given coordinate-transformed dot and the next dot to be coordinate-transformed. On the basis of the difference thus obtained, the Y-direction straight line generator generate an increment signal of zero or an integer value for each of the X-and Y-directions (zero or +1 or −1 in this embodiment). These X-and Y- direction straight line generators are well known in the art, and therefore, further explanation will be omitted.

Further, there are provided a pair of registers 16 and 18 adapted to receive and hold the values $\Delta X$ and $\Delta Y$ from the processing apparatus 10, respectively. These values $\Delta X$ and $\Delta Y$ are a set of integers fulfiling such a relation that $\Delta X/\Delta Y$ is perfectly of substantially equal to $\tan\theta$ (where $\theta$ is a required rotational angle).

In this embodiment, accordingly, the X-direction straight line generator 12 operates to receive, as an initial value, the destination coordinate position of a leading dot of the rotated pattern, which is outputted from the processing apparatus 10. In addition, the X-direction straight line generator 12 reads the integer values $\Delta X$ and $\Delta Y$ held in the registers 16 and 18. On the basis of these input data, the generator 12 generates a pair of increment signals $XD_X$ and $YD_X$ representative of differences $\Delta XD$ and $\Delta YD$ in X- and Y- directions on the destination coordinate, which differences correspond to the difference ($\Delta \times S = 1$) between the leading dot (or the given coordinate-transformed dot) and an dot adjacent thereto on a X-direction dot line $L_K$ (k=1, 2, ... DV) on the source coordinate. Such differences minimize a deviation between the transformed dot position on the destination coordinate and a straight line $M_K$ obtained by geometrically rotating the line $L_K$ by the angle $\theta$.

Therefore, if
$|\theta|<45°$,
$\Delta XD=1$ and
$|\Delta YD|=1$ or 0.

if
$|\theta|>45°$,
$\Delta XD=1$ or 0 and
$|\Delta YD|=1$

The pair of increment signals $XD_X$ and $YD_X$ from the X-direction straight line generator 12 are inputted to an adder 20 and an AND circuit 22.

On the other hand, the Y-direction straight line generator 14 also receives, as an initial value, the destination coordinate position of a leading dot of the rotated pattern, which is outputted from the processing apparatus 10. In addition, the Y-direction straight line generator 14 reads the integer values $\Delta X$ and $\Delta Y$ held in the registers 16 and 18. On the basis of these input data, the generator 14 generates a pair of increment signals $XD_Y$ and $YD_Y$ representative of difference $\Delta XD$ and $\Delta YD$ in X- an Y- directions on the destination coordinate corresponding to the difference between the leading dot of the given coordinate-transformed X-direction line and the leading dot of an adjacent X-direction line to be coordinate-transformed next. Namely, the generator 14 provides coordinate transformation information for coordinate rotation of a straight line connecting the leading dots of all the X-direction lines $L_K$ on the source coordinate.

The system also includes another pair of registers 24 and 26 which receive and hold the destination coordinates XD and YD of the leading dot outputted from the processing apparatus 10 at the initialization stage. In the succeeding operation, the registers 24 and 26 hold the destination coordinates XD and YD inputted from the adder 20. On the other hand, the adder 20 reads the destination coordinates XD and YD from the registers 24 and 26 and adds the input increment signals $XD_X$, $YD_X$, $XD_Y$ and $YD_Y$ with the designation coordinates XD and YD. The added values are outputted and held in the registers 24 and 26, again. Namely, the registers 24 and 26 are updated each time the generators 12 and 14 generate the increment signals.

Furthermore, there are provided registers 28, 30, 32 and 34, which are respectively written at an initialization stage by the processing apparatus with the reference dot source coordinate position $XS_1$ and $YS_1$ and the dot lengths DH and DV in X- and Y- directions of a rectangular pattern on the source coordinate to be rotated, respectively. In operation, the data held in these registers 28 to 34 are read by the processing apparatus 10.

Registers 36, 38, 40 and 42 are associated with the registers 24, 26, 28 and 32, respectively, for reserving the data held in the respective registers.

The AND circuit 22 has inputs connected to generator 12 and has an output connected to a dot generator 44. When the AND circuit 22 generates a logic signal of "1" in response to both the increment signals $XD_X$ and $YD_X$ of "1" from the generator 12, (after the result of addition from the adder 20 is stored in the registers 24 and 26), the dot generator 44 reads the data XD from the register 24 and then writes a 1-substracted data, XD-1, to the register 24. At the same time, the generator 44 generates a control signal for writing dot information stored in a register 46 associated with a display memory 48, to a coordinate position (XD-1, YD). Thereafter, the generator 44 writes the data XD to the register 24, again. Namely, the content of the register 24 is returned from XD-1 to XD.

The system also includes an address control circuit (or drawer) 50 which reads the data from the registers 24, 26, 28 and 30 so as to calculate an address of the display memory 48 to which a read/write should be executed. The calculated address is supplied to the display memory 48, so that a dot information is read from the designated address. The read dot information is temporarily held in the register 46.

The display memory 48 is controlled by a read/write control signal outputted from the processing apparatus 10. Namely, after a dot information held in the address of the display memory 48 designated by the drawer 50 and corresponding to the position (XS, YS) on the source coordinate is read to and held in the register 46, the dot information held in the register 46 is written to an address of the display memory designated by the drawer 50 corresponding to the position (XD, YD) on the destination coordinate corresponding to the source coordinate position (XS, YS). Furthermore, the display memory 48 is controlled by the control signal generated by the dot generator 44 to write the same dot information as that on the destination coordinate position (XD-1, YD-1), to an address of the display memory corresponding to the position determined by the coordinate position XD-1 written to the register 24 from the dot generator 44 and the coordinate position YD held in the register 26.

Figure 4:
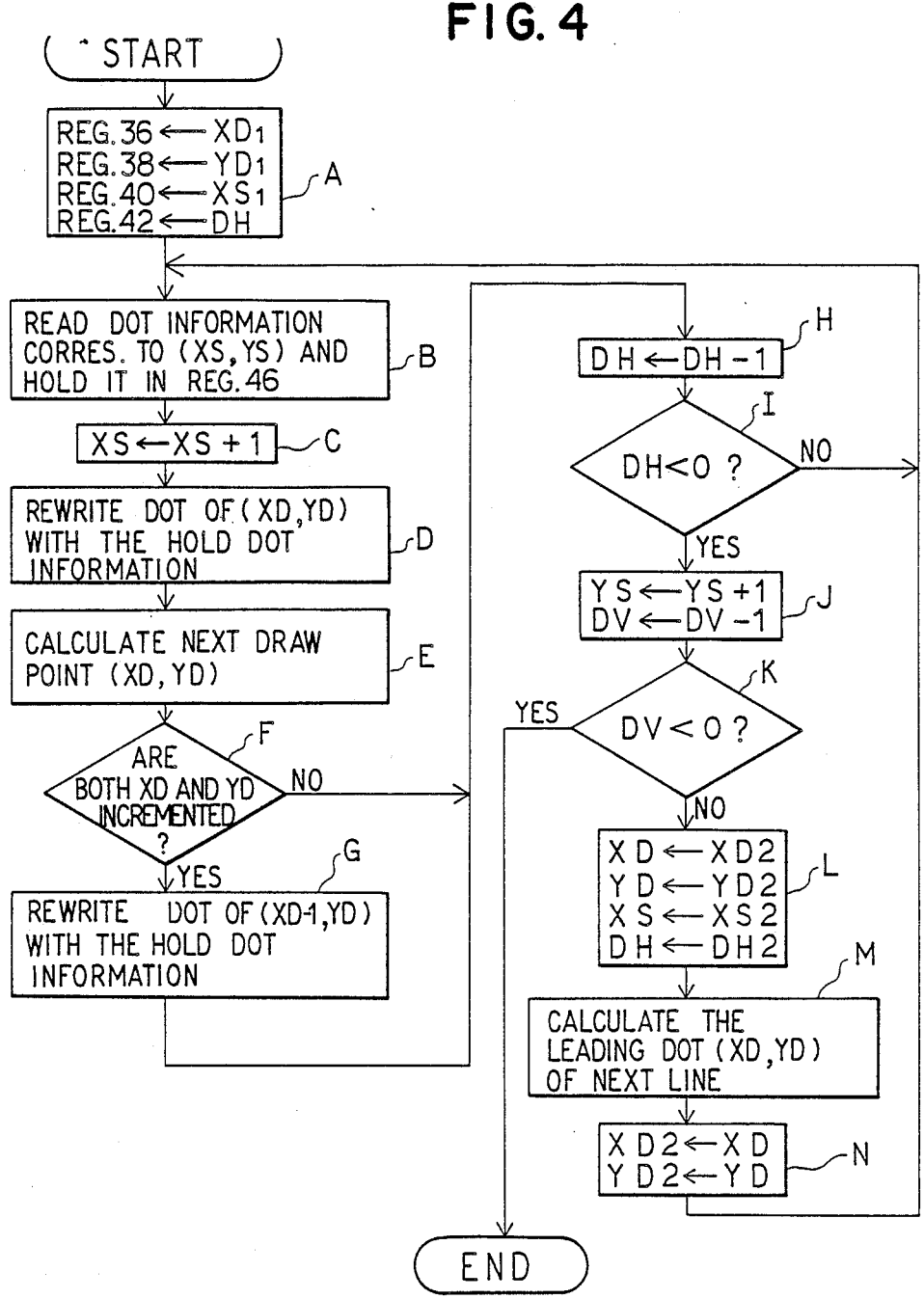
FIG. 4 is a flow chart illustrating the operation of the system shown in FIG. 2.

Now, operation of the system will be explained with reference to FIG. 4 in the case of a rectangular pattern P being drawn in the source coordinate and the rotational angle being less than 45 degree.

Assume that the X- and Y- direction straight line generators 12 and 14 are previously initialized so as to calculate necessary increments in the coordinate system in accordance with the integer values $\Delta X$ and $\Delta Y$ defined by a given rotational angle $\theta$. These increments are calculated each time the dot position to be coordinate-transformed is shifted dot by dot on the source coordinate, and the various registers are set with initial values as the result of the initializing operation of the processing apparatus 10. Namely, the generators 12 and 14 are inputted with the destination coordinate position $(XD_1, YD_1)$ from the processing apparatus 10. The coordinate position $(XD_1, YD_1)$ constitutes a reference point. Further, the registers 24, 26, 28, 30, 32 and 34 are written with data $XD_1, YD_1, XS_1, YS_1$, DH and DV respectively by the processing apparatus 10.

Figure 3A:
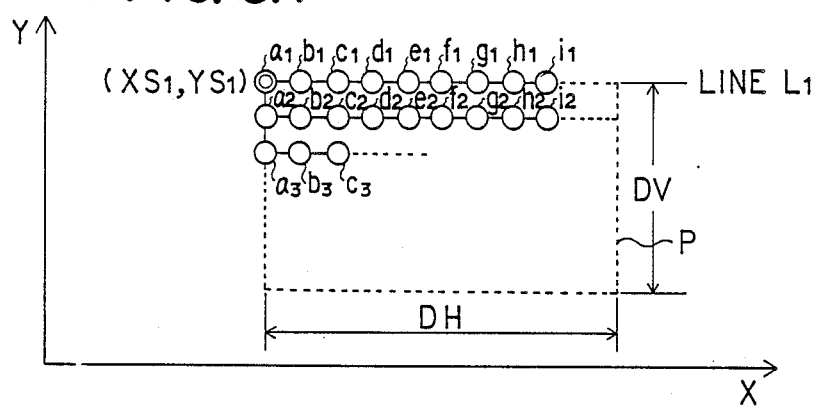
FIG. 3A illustrates one example of a dot distribution included in a given rectangular pattern on the source coordinate.

First, the data $XD_1, YD_1, XS_1$ and DH are reserved in the registers 36, 38, 40 and 42 (Step A). A dot information ($a_1$ shown in FIG. 3A) corresponding to the source coordinate reference position $(XS_1, YS_1)$ is read from the display memory 48 and held in the register 46 (Step B). The data XS is incremented by +1 (Step C). The dot position ($a_1$ shown in FIG. 3C) defined by the destination coordinate position $(XD_1, YD_1)$ is rewritten with the dot information held in the register 46 (Step D).

Next, the X-direction straight line generator 14 is operated to calculate the next draw point (XD, YD) to which a dot ($b_1$ shown in FIG. 3A) adjacent to the reference coordinate $(XS_1$ and $YS_1)$ in the same line on the source coordinate should be converted (Step E). At this time, it is discriminated whether or not both of XD and YD are incremented (Step F). If both of them are incremented, a dot ($a_{11}$ shown in FIG. 3C) corresponding to the position (XD-1, YD) is rewritten with the dot information held in the register 46 under the control of the dot generator 44 (Step G). To the contrary, if only the data XD is incremented, the dot generator 44 is not operated.

Thereafter, the data DH is decremented by 1 (i.e., added with $-1$) (Step H). Then, it is discriminated whether or not the data DH is less than zero (Step I). If DH is equal to or larger than zero, the operation is returned to the step B. Thus, the above mentioned step sequence is repeated on the dots $b_1, c_1, d_1, \ldots$ until DH becomes less than zero. If DH becomes less than zero, YS is incremented by +1, and at the same time DV is decremented by 1 (i.e., added with $-1$) (Step J). Then, it is discriminated whether or not DV is less than zero (Step K). If DV is less than zero, the operation is terminated. But, if DV is not less than zero, the contents of the registers 24, 26, 28 and 32 are returned to the data stored in the registers 36, 38, 40 and 42, respectively (Step L). Then, the Y-direction straight line generator 14 is operated to calculate the destination coordinate position $(XD_2, YD_2)$ of the leading dot ($a_2$ shown in FIG. 3C) of the next line $L_2$ (Step M). The data $XD_2$ and $YD_2$ are reserved in the registers 36 and 38 (Step N), and the operation is returned to the step B. Thus, the above mentioned operation is repeated until DV becomes less than zero.

Figure 3B:
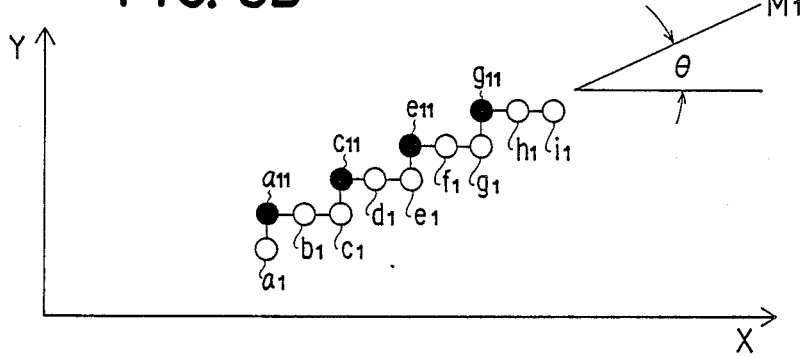
FIG. 3B illustrates a rotated straight line generated by the system shown in FIG. 2 from a line $L_1$ on the source coordinate shown in FIG. 3A.
Figure 3C:
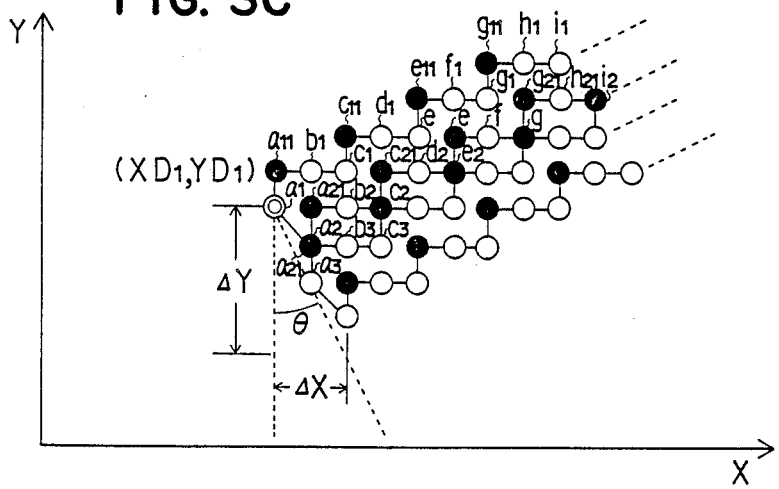
FIG. 3C illustrates a rotated pattern generated by the system shown in FIG. 2 from the rectangular pattern on the source coordinate shown in FIG. 3A.

Accordingly, as shown in FIG. 3C, there is obtained a rotated pattern which does not have an unredrawn residual portions called "bugs". The dots $a_{11}, c_{11}, e_{11}$ and $g_{11}$ shown in FIG. 3B and the black dots shown in FIG. 3C are supplemented by the dot generator 44, which correspond to the residual portions in a rotated pattern obtained by the conventional apparatus.

The operation of the system shown has been explained in the case of the rotational angle $\theta$ less than 45 degree. But, the system can generate a rotated pattern having no residual portions even in the case of a rotational angle not less than 45 degree. In a rotated pattern generation system using a pair of straight line generators, a pattern added with not only rotation but also inclination can be generated by adjusting the inclination between the two generated straight lines. The present invention can be also applied to this type of rotated pattern generation system. Further, the present invention can be applied to rotation of a non-rectangular pattern and rotation of a rectangular pattern out of parallel to the X- and Y- axes of the source coordinate. In these cases, however, the processing will become complicated to some extent.

The invention has thus been shown and described with reference to the specific embodiment. However, it should be noted that the invention is in no way limited to the details of the illustrated structures but changes and modifications may be made within the scope of the appended claims.

I claim:

1. A rotated pattern generating system for generating destination coordinates from source coordinates comprising:

an X-direction straight line generator for calculating a difference in X- and Y- directions between the position of a given coordinate transformed from source coordinates to destination coordinates and a position of the next dot to be coordinate transformed, said difference determined by the difference in the source coordinates between a given dot and the next dot to be transformed and a required rotational angle $\theta$;

a detector connected to the X-direction straight line generator for detecting whether or not a residual pattern occurs each time the X-direction straight line generator generates an output; and a dot generator responsive to the output of the detector to generate, on the position of the residual pattern the same dot information as that of the dot adjacent to the residual pattern position in the destination coordinate when a residual pattern is detected by said detector.

2. A system claimed in claim 1 wherein the detector includes an AND circuit connected to the X-direction straight line generator for generating a detection signal when the X-direction straight line generator outputs an increment signal in both of the X- direction and the Y-direction on the destination coordinate.

3. A rotated pattern generating system for rotating by a given rotational angle $\theta$ a dot pattern information stored in a given area in a display memory, comprising:
a display memory storing a dot information for a dot pattern to be rotated by a given rotational angle $\theta$;
a source coordinate register for holding a dot coordinate position in a source coordinate defining the dot pattern before the pattern rotation;
a destination coordinate register for holding a dot coordinate position on a destination coordinate defining a dot pattern after the pattern rotation;
a X-direction straight line generator for generating a first pair of increment signals of zero or integer values for X-and Y- directions, the first pair of increment signals being respectively representative of a difference in X- and Y- directions between the destination coordinate position of a given coordinate-transformed dot and the destination coordinate position of the next dot to be coordinate-transformed, in accordance with the given rotational angle $\theta$ and on the basis of the difference on the source coordinate between the given coordinate-transformed dot and the next dot to be coordinate-transformed;
a Y-direction straight line generator for generating a second pair of increment signal of zero or integer values for X-and Y- directions, the second pair of increment signals being respectively representative of a difference in X- and Y- directions between the destination coordinate position of another given coordinate-transformed dot and the destination coordinate position of another next dot to be coordinate-transformed, in accordance with the given rotational angle $\theta$ and on the basis of the difference on the source coordinate between the another given coordinate-transformed dot and the another next dot to be coordinate-transformed;
an adder receiving the first and second pair of increment signals and the current coordinate position data held in the destination coordinate register so as to output, as the next destination coordination position data, the results of addition to the destination coordinate register;
a memory access control means receiving the data from one of the source coordinate register and the destination coordinate register to calculate an address of the display memory to be accessed and to output the calculated address to the display memory;
a dot information register for holding dot information read out from the address of the display memory designated by the memory access control means;
a processing unit for initializing the above mentioned generators and registers and controlling the read/write of the display memory; and
a dot generator discriminating whether or not a residual pattern occurs each time the X-direction straight line generator generates the increment signal, and for generating, when a residual pattern is discriminated, a signal which causes said display memory to store on the position of the residual pattern the same dot information as that of the dot adjacent to the residual pattern position in the destination coordinate.

* * * * *